United States Patent [19]

Drysdale

[11] Patent Number: 5,177,473
[45] Date of Patent: Jan. 5, 1993

[54] FOOT OPERATED ELECTRICAL CONTROL WITH POTENTIOMETERS

[76] Inventor: Frank R. Drysdale, 912 Van Buren, Eugene, Oreg. 97402

[21] Appl. No.: 676,448

[22] Filed: Mar. 28, 1991

[51] Int. Cl.$^5$ .............................................. G09G 3/02
[52] U.S. Cl. ..................................... 340/706; 74/512; 74/478; 74/560; 338/153; 338/118; 434/45; 434/43
[58] Field of Search .............. 74/512, 478, 559, 96, 74/481; 338/108, 153, 118, 176, 170, 167; 434/30, 29, 37, 45; 272/31 A, 31 B; 244/235, 236; 273/148 B, 85 G, 28 DIG.; 340/706

[56] References Cited

U.S. PATENT DOCUMENTS

| | | | |
|---|---|---|---|
| 2,955,362 | 10/1960 | Theobald | 35/12 |
| 4,470,570 | 9/1984 | Sakurai et al. | 244/235 |
| 4,599,070 | 7/1986 | Hladky et al. | 434/45 |
| 4,695,819 | 9/1987 | Bowsher | 74/512 |
| 4,713,007 | 12/1987 | Alban | 434/45 |
| 4,852,031 | 7/1989 | Brasington | 364/578 |

Primary Examiner—Jeffery A. Brier
Assistant Examiner—A. Au
Attorney, Agent, or Firm—James D. Givnan, Jr.

[57] ABSTRACT

A foot operated electrical control is disclosed with simulated aircraft rudder pedals coupled to potentiometers for providing signals to a microcomputer having a flight simulation program. The pedals are additionally linked to one another by slides and a rocker arm for simultaneous pedal travel in opposite directions. The potentiometers may provide cumulative signals determined by pedal displacement or distinct signals when functioning independently of one another. For this latter purpose a carrier block for the rocker arm is positionable out of engagement with the foot pedals. Opposed springs of the control serve to position the pedals in an upright static position. Each pedal is coupled to a potentiometer by spring and pedal biased slides with one of the slides in wiping contact with the pedal.

7 Claims, 2 Drawing Sheets

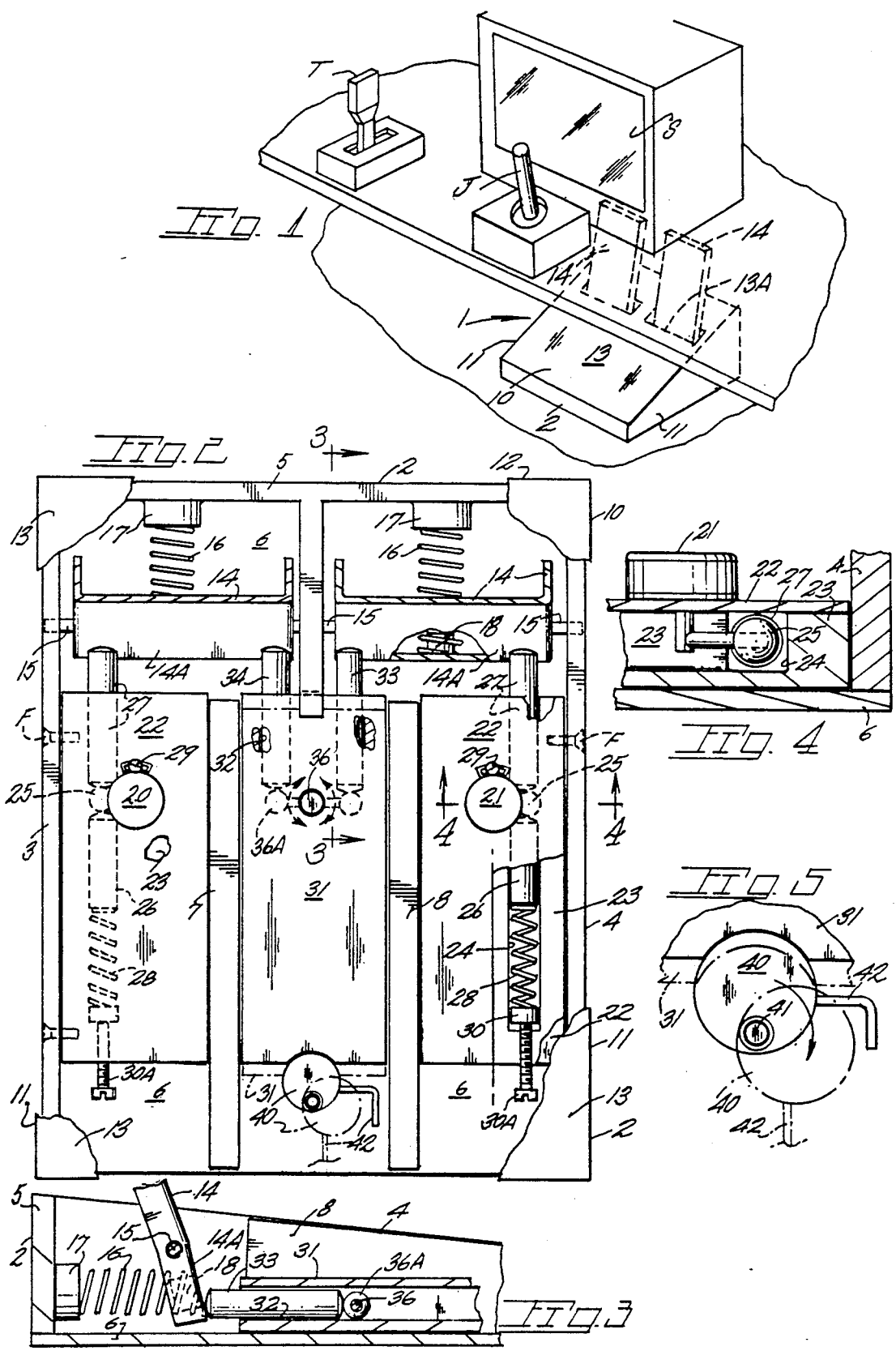

FOOT OPERATED ELECTRICAL CONTROL WITH POTENTIOMETERS

BACKGROUND OF THE PRESENT INVENTION

The present invention pertains generally to foot actuated, electrical controls for providing a signal to a microcomputer or other device.

Available today are computer programs that provide a screen display on a monitor of a simulated instrument panel as well as what a pilot would see during various stages of a flight e.g., runway, terrain, other aircraft. Mock-up flight or other controls may be utilized to provide signals to the computer via a game card port. Flight simulator programs can be driven with a keyboard, a mouse, and/or joystick(s). These devices provide electrical signals to the microcomputer, which are translated by the program to simulate aircraft movement. This information is then displayed graphically on the computer monitor to show changes in cockpit instruments and various views from the simulated airplane. In an optional auto-coordinated mode, movement of the airplane rudder is automatic with movement of the ailerons by electrical inputs from the keyboard, mouse, and/or joystick(s). In an uncoordinated mode, movement of the rudder is independent of the ailerons. In this mode, rudder movement is made through the keyboard, or a second joystick which are digital devices that can directly communicate with computer and software. The joystick is a hand operated, analog device that has a control connected to two potentiometers connected to a microcomputer via a game card adaptor. The variable resistances are converted to a digital output by the game card adaptor. Depending upon the values measured, the ailerons, elevators, rudder and/or throttle will move by an amount specified in the flight simulation program.

Flying involves all the senses and the total coordination of eyes, hands, and feet. The conventional keyboard, mouse, and joystick make no provision for the use of feet in microcomputer flight simulation. All of these devices are hand operated. However, in most airplanes the feet operate the rudder which is essential for coordinated turns, crosswind landings and takeoffs, corrections during instrument approaches and recovery from spins.

U.S. Pat. No. 4,713,007 discloses yoke, throttle and rudder controls all in electrical circuit with a personal computer. Each of the controls is mechanically coupled to a potentiometer. The simulated rudder control includes a horizontal bar journalled at its center for swinging about a vertical axis. Pedals are fixedly located at the ends of the bar for travel in atypical fashion in a horizontal arc.

U.S. Pat. No. 4,599,070 discloses a simulator yoke wherein axial as well as rotational yoke movement is resisted by opposed spring elements. Control movement is sensed by potentiometers of the rotary or slide type. The flight simulation system disclosed is not intended for use with a personal computer.

U.S. Pat. No. 4,852,031 discloses a personal computer equipped with a flight simulation program with a mock-up instrument panel provided with a movable yoke. No provision is made for rudder pedals.

U.S. Pat. No. 2,955,362 discloses a flight simulator wherein reaction to simulator controls is provided by spring elements. Displacement of such controls is sensed by potentiometers of various types.

The known controls fail to provide a rudder control providing a true simulation of an aircraft's rudder pedals.

SUMMARY OF THE PRESENT INVENTION

The present invention is embodied within a control having pedals which move opposite to one another to accurately simulate the rudder pedals of an aircraft and which provide electrical signals to a personal computer equipped with a flight simulator program. Provision is additionally made for independent or single pedal operation permitting other uses of the control.

The present control includes a housing positionable on a floor surface and in which a pair of pedals are provided each mounted for fore and aft movement in opposite directions. Resilient members within the housing bias each of the pedals to a neutral position. Pedal movement is imparted to potentiometers via yieldably mounted components. Provision is made for varying pedal positioning and pedal action as well as accurately duplicating the opposed travel of rudder pedals by coupling same to one another. Repositioning of a single component enables operation of the present control in a single pedal mode to increase the usefulness of the present foot-operated control beyond that of a mock-up flight control.

Important objectives of the present control include the provision of a foot operated control wherein a pair of pedals move simultaneously in opposite fore and aft directions in response to foot exerted pressure on one pedal similar to the movement of aircraft rudder pedals; the provision of a foot operation control having potentiometers which provide a signal to a microcomputer having a flight simulation program to provide the user a more accurate and complete simulation of aircraft operation; the provision of a foot operated control for providing electrical signals resulting from potentiometers each responsive to a foot pedal; the provision of a foot operated control including a rocker arm and plungers providing motion translating means imparting movement from a foot biased pedal of the control to the remaining pedal with movement of the latter being in a direction opposite to the foot biased pedal; the provision of a foot operated control providing the user the option of a pair of pedals moving in a linked manner to operate a pair of potentiometers in series with one another as well as having the capability of operating singly to provide separate electrical signals.

BRIEF DESCRIPTION OF THE DRAWINGS

In the drawings:

FIG. 1 is a perspective view of a desk-top computer equipped with peripheral mock-up flight controls including the present foot operated control;

FIG. 2 is a plan view of the present foot operated control with a cover broken away to disclose internal components which additionally have fragments broken away for purposes of illustration;

FIG. 3 is a vertical sectional view taken along line 3—3 of FIG. 2;

FIG. 4 is a vertical sectional view taken along line 4—4 of FIG. 2;

FIG. 5 is a fragmentary plan view of a manually positionable component to enable alternate use of the present foot control beyond that of a flight control.

DETAILED DESCRIPTION OF PREFERRED EMBODIMENTS

Figure 6:
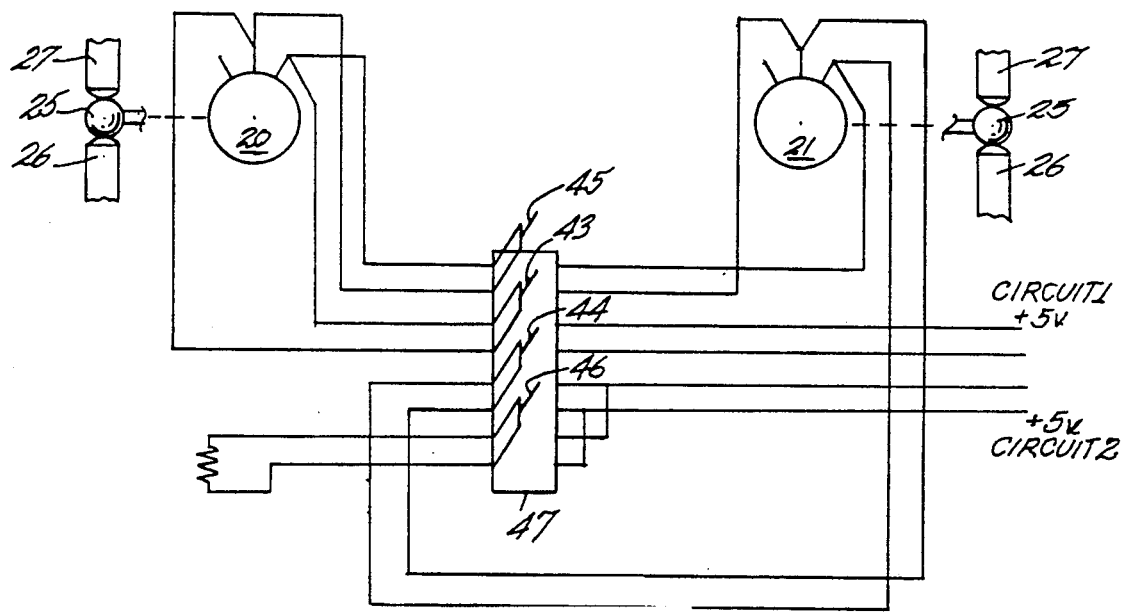
FIG. 6 is a schematic of electrical components of the control.

With continuing attention to the drawings wherein applied reference numerals indicate parts similarly hereinafter identified, the reference numeral 1 indicates generally the present foot operated control. A computer monitor or screen is at S, a mock-up throttle is at T and a mock-up yoke or stick is at J shown as a joystick control.

The control includes a housing 2 comprised of side walls 3 and 4, and end wall 5 and a bottom wall 6. Partitions at 7 and 8 denote interior areas of the housing for reception of the following described components. A pad on bottom wall 6 prevents slippage during control use.

A cover 10 is removably placed on the housing and includes a pair of side walls 11 and an end wall 12 with a top wall 13 defining openings as at 13A through which project a pair of pedals at 14.

The pedals 14 are carried by a shaft 15 with the shaft, as shown in FIG. 3, extending through a lower portion 14A of each pedal. An upper portion, above shaft 15, provides an exposed upright tread surface for foot contact. Lower pedal portions 14A are biased by spiral springs 16 having one end removably mounted in housing attached cups 17 while the remaining end of the springs are disposed about bosses 18 on the pedals. Accordingly springs 16 may be readily removed for purposes later noted.

Potentiometers at 20 and 21 are part of like components of the control and accordingly the following description of one such component is believed adequate. An elongate unit base 23 is closely confined between a housing sidewall and a housing partition and secured in place as by fasteners F. Said base defines a channel 24 open at its end opposite a pedal 14. A plate 22 overlies the base 23 and serves to carry potentiometer 21. A potentiometer arm is fitted with a spherical fitting 25 disposed within channel 24 where it is positioned by slides or plungers at 26 and 27 in said channel. A spiral spring 28 in the channel biases both slides 26 and 27 as well as potentiometer arm end 25 in one direction. As slide 27 is in sliding contact with pedal lower portion 14A it will be seen that lower pedal portion 14A will displace slide 27 for partial slide retraction into base 23. Positioning of spring 28 and slide 26 is by an adjustable follower 30 and a screw 30A for precise positioning of potentiometer arm 25. Each potentiometer is provided with trimming adjustments as at 29.

Pedal motion translation means for imparting opposite movement to the idle or non-foot biased pedal and includes a carrier block 31 having a pair of bores 32 to receive slides or plungers at 33 and 34 which at their inner ends bear against a pivotally mounted rocker arm 36. The outer end of each slide 33–34 is in abutment with a lower pedal portion 14A. Accordingly, for example foot exerted forward pressure on right hand pedal 14 causes slide 33 to partially retract into carrier block 31 to impart arcuate clockwise movement to rocker arm end 36A to advance remaining slide 34 in an outward direction to impart rearward motion to the lower portions 14A of remaining pedal 14. Rocker arm 36 is provided with spherical ends 36A which cooperate with radiussed inner ends of slides 33 and 34.

For deactivating the motion translation means to permit independent pedal movement as when the present control is being utilized other than as a rudder control in a flight simulator, a retainer at 40 is provided which has a forward position, shown in full lines, and a retracted position shown in broken lines. In the broken line position, foot biased movement of a pedal 14 results in carrier block 31 being displaced toward retainer 40 to deactivate the motion translation means and prevent rotational movement of the rocker assembly. Accordingly carrier block 31 is retracted by initial movement of one pedal 14 after retainer 40 has been manually positioned to the broken line position about pivot pin 41. The off center pin permits movement of a retainer finger grip 42 to swing the retainer about pivot pin 41 away from carrier block 31.

With attention to the wiring schematic in FIG. 6, the potentiometers 20 and 21 are provided with five volts as required by most microcomputers. Other voltages may be utilized to suit the requirements at hand. Closing double pole switches 43 or 44 and 45 respectively puts the potentiometers in series in circuit 1 or circuit 2 with current changes being cumulative as when the present control is used in conjunction with a computer having a flight simulation program.

Double pole switches 43–44 when closed (with switch 45 open) permit the potentiometers 20 and 21 to operate singly to permit one or both foot pedals 14 to provide signals to enable optional use of the present control to best suit the purposes at hand. Switch block 47 is a terminal installed in place on housing 1 for convenient user selection of circuits 1 and 2.

In a typical flight simulation application with the potentiometers in series, the output or signals are applied to circuit 1 or circuit 2. When functioning independent of one another, the potentiometers may provide separate signals respectively to circuits 1 and 2.

In use as rudder control in combination with a microcomputer, the potentiometers both have a neutral or unbiased position with the corresponding combined resistance being for example 50K ohms applied to a computer game card adapter. When the control is wired as per FIG. 6 foot pressure on left foot pedal 14 will cause potentiometer arm 25 of potentiometer 20 to move counterclockwise to decrease resistance resulting in an increased current flow in circuit 1 assuming double pole switch 43 is closed. The increased current flow above the set point is read by the computer. Similarly upon closure of double pole switch 44 5 v. is applied to potentiometer 21. Clockwise movement of potentiometer arm 25, upon foot actuation of right foot pedal 14, will increase resistance to reduce current flow, below the set point, through switch 44 in circuit 2.

When the pedals function as aircraft rudder pedals conjointly but in opposite directions through rocker arm 36, current fluctuations from both potentiometers are of a magnitude readily sensed by the computer. Double pole switch 46, when closed, applies a constant resistance or load to circuit 2 for calibration purposes.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. A foot operated control for providing a variable voltage output to a personal computer having a flight simulation program, said control including,
   a housing,
   first and second pedals carried by said housing for individual displacement by foot pressure,
   spring means acting on each of said pedals in opposite directions,
   first and second potentiometers,
   means coupling one each of said pedals to one each of said potentiometers to regulate potentiometer output,
   pedal motion translating means including a carrier block movably mounted in said housing and having a first position operable to move each of said pedals in a direction opposite to the foot urged travel of the remaining pedal in the manner of aircraft rudder pedals and a second position to render the pedals operatively independent of each other,
   said potentiometers in circuit with a terminal.

2. The foot operated control claimed in claim 1 wherein said carrier block includes a rocker arm, plungers in said carried block acting on said rocker arm, one each of said plungers responsive to one each of said pedals whereby foot urged movement of one of said pedals imparts motion to said rocker arm to rotate same to reposition the other of said plungers and the pedal in contact therewith in an opposite direction.

3. The foot operated control claimed in claim 2 additionally including a retainer for supporting the carrier block in said first position and against plunger exerted forces.

4. The foot operated control claimed in claim 1 wherein said coupling means includes plungers, spring means biasing said plungers, some of said plungers in endwise sliding contact with said pedals.

5. The foot operated control claimed in claim 1 additionally including switch means in the terminal in circuit with said potentiometers and operable to put said potentiometers in series with one another for cumulative signal output, said switch means additionally operable to provide independent output signals from said potentiometers to separate circuits.

6. In a foot operated electrical control including a housing and a pedal movably mounted in said housing, the improvement comprising,
   a base in said housing and having a channel,
   a potentiometer on said base having an arm disposed in said channel,
   a first plunger in said channel and positionable in one direction by said pedal to move the potentiometer arm in one direction to vary the output of the potentiometer, a second plunger in said channel and also acting on said potentiometer arm to move same in a second direction oppositely to said first direction to vary potentiometer output, spring means acting on said second plunger to position the potentiometer arm to an initial position in the absence of foot pressure on the pedal.

7. A foot operated electrical control comprising,
   a housing,
   pedals movably mounted on said housing,
   spring means biasing said pedals to an upright position,
   potentiometers mounted in said housing,
   slide means coupling said pedals to said potentiometers whereby movement of said pedals causes a change in potentiometer output,
   pedal motion translation means in said housing including a carrier block having a rocker arm and slides in contact one each with each of said pedals and said rocker arm for imparting movement to one of said pedals opposite the direction of travel of the foot biased other of said pedals in the manner of aircraft rudder pedals, and
   a terminal on said housing, said terminal including switch means in circuit with said potentiometers and operable to put said potentiometers in series with one another for cumulative signal output, said switch means additionally operable to provide independent output signal from said potentiometers to separate circuits.

* * * * *